United States Patent
Tu et al.

(10) Patent No.: US 7,362,275 B2
(45) Date of Patent: Apr. 22, 2008

(54) INTERNAL ANTENNA AND MOTHERBOARD ARCHITECTURE

(75) Inventors: Jerome Tu, Saratoga, CA (US); Weiping Dou, San Jose, CA (US)

(73) Assignee: Palm, Inc., Sunnyvale, CA (US)

( * ) Notice: Subject to any disclaimer, the term of this patent is extended or adjusted under 35 U.S.C. 154(b) by 51 days.

(21) Appl. No.: 11/355,159

(22) Filed: Feb. 14, 2006

(65) Prior Publication Data

US 2007/0188391 A1  Aug. 16, 2007

(51) Int. Cl.
*H01Q 1/24*  (2006.01)
(52) U.S. Cl. .................................... 343/702
(58) Field of Classification Search ............... 343/702, 343/700 MS, 846, 848, 841; 455/90.3, 117, 455/575.5
See application file for complete search history.

(56) References Cited

U.S. PATENT DOCUMENTS

| | | | |
|---|---|---|---|
| 6,011,519 A | 1/2000 | Sadler et al. | |
| 6,806,835 B2 | 10/2004 | Iwai et al. | |
| 6,861,989 B2 | 3/2005 | Morningstar et al. | |
| 6,894,649 B2 * | 5/2005 | Ostervall | 343/702 |
| 6,914,570 B2 | 7/2005 | Asrani et al. | |
| 7,099,632 B2 * | 8/2006 | Hong et al. | 455/90.3 |
| 7,199,762 B2 * | 4/2007 | Liu et al. | 343/702 |
| 2004/0046701 A1 * | 3/2004 | Huber et al. | 343/702 |
| 2004/0253972 A1 * | 12/2004 | Iwai et al. | 455/550.1 |
| 2007/0052589 A1 * | 3/2007 | Liu | 343/700 MS |

* cited by examiner

*Primary Examiner*—Huedung Mancuso
(74) *Attorney, Agent, or Firm*—Kacvinsky LLC

(57) ABSTRACT

Various embodiments of an internal antenna and motherboard architecture are described. In one embodiment, a wireless device may include a housing enclosing a first motherboard and a second motherboard. The ground plane of the first motherboard may be coupled to the ground plane of the second motherboard within the housing. The first motherboard and the second motherboard may act as an internal antenna system for the wireless device. Other embodiments are described and claimed.

20 Claims, 13 Drawing Sheets

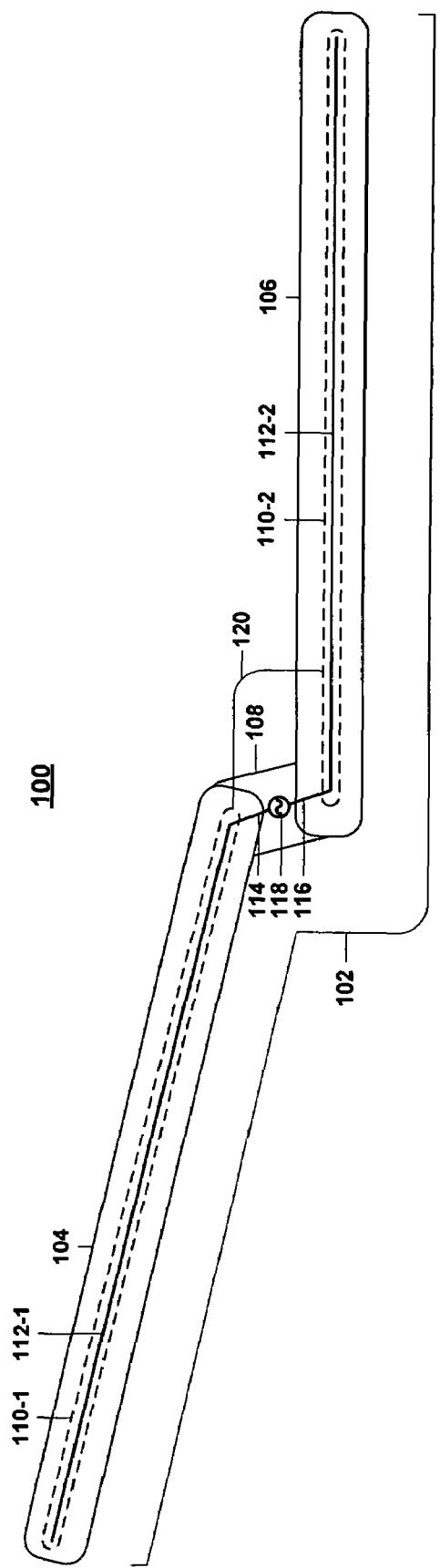
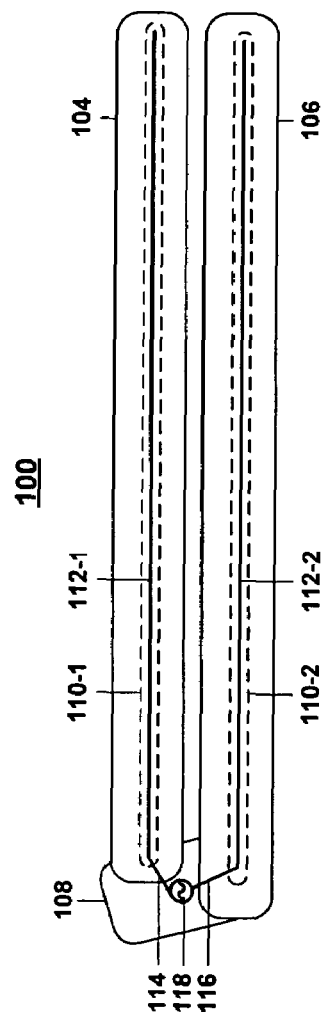
FIG. 1B
FIG. 1C

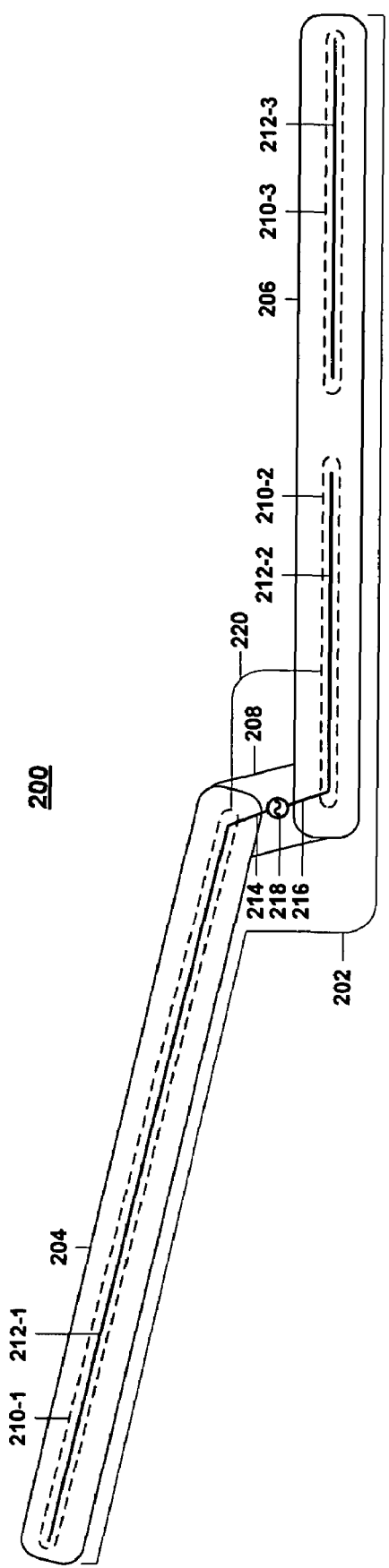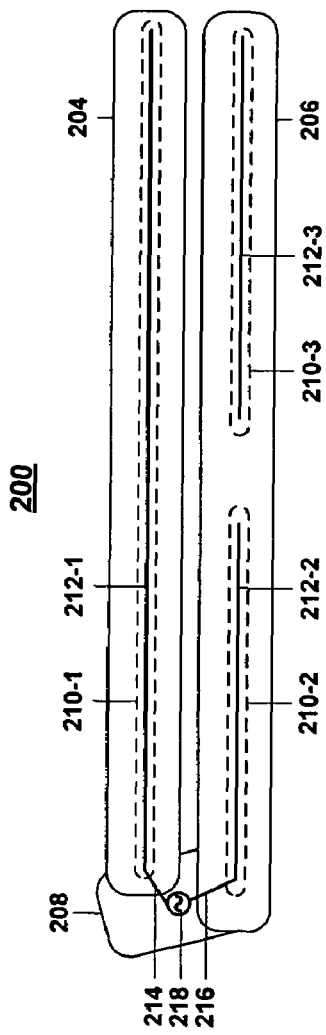
FIG. 2B
FIG. 2C

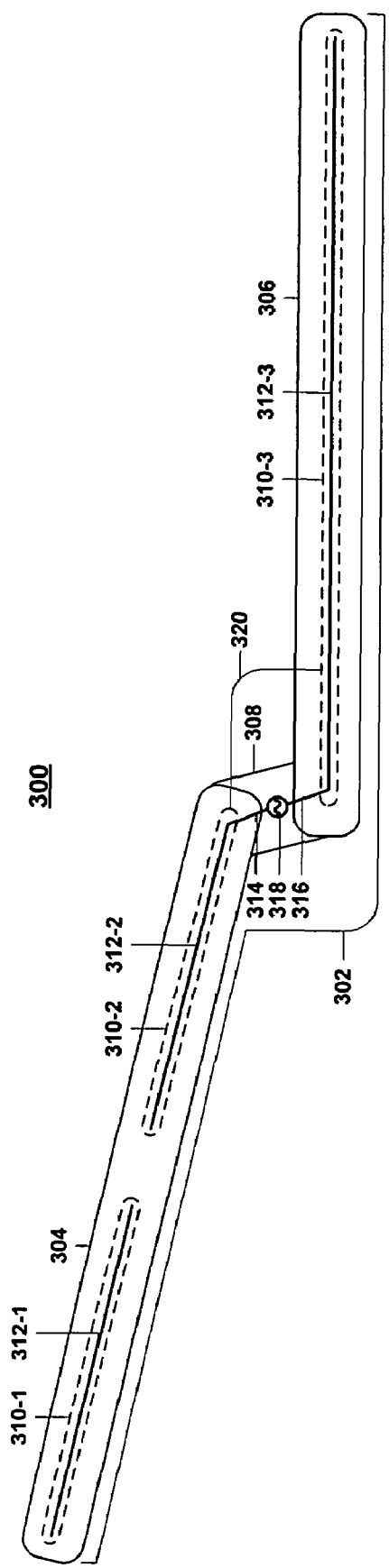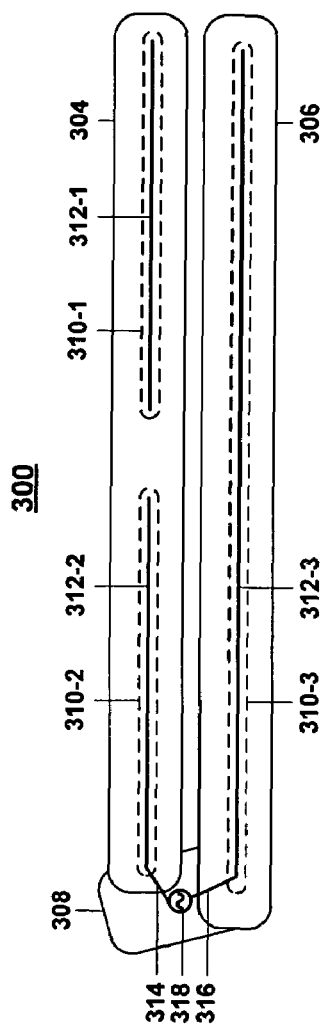
FIG. 3A
FIG. 3B

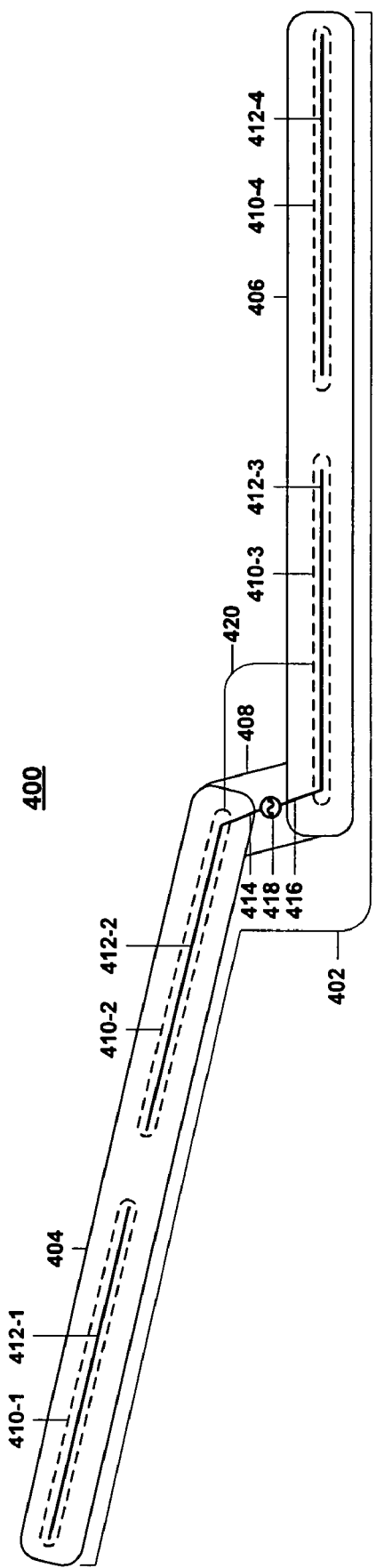
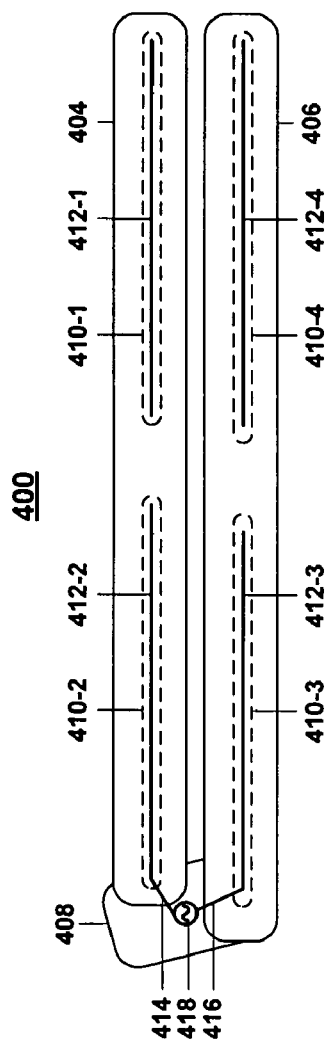
FIG. 4A
FIG. 4B

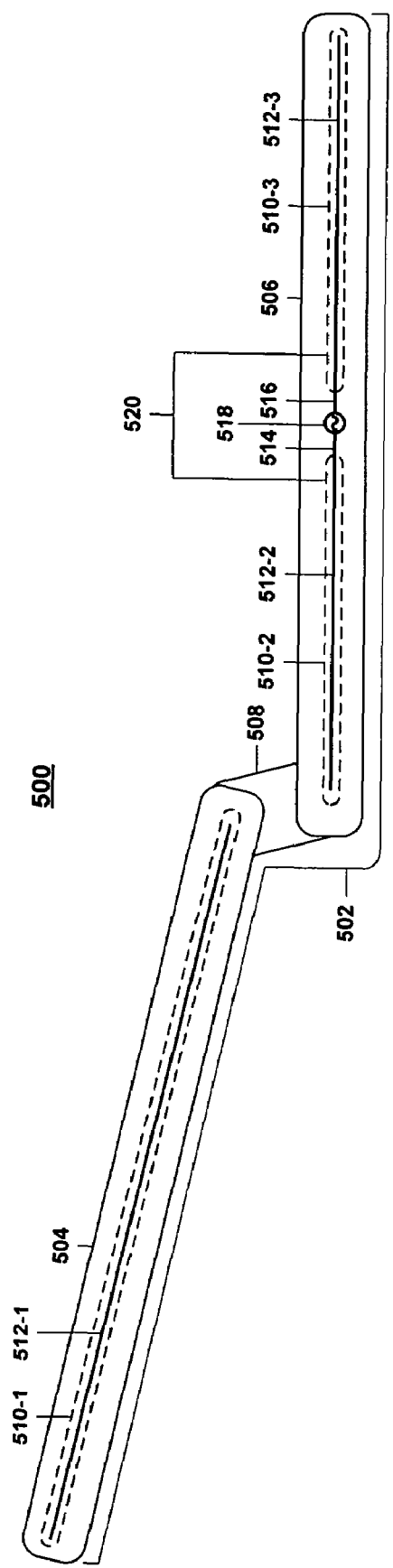
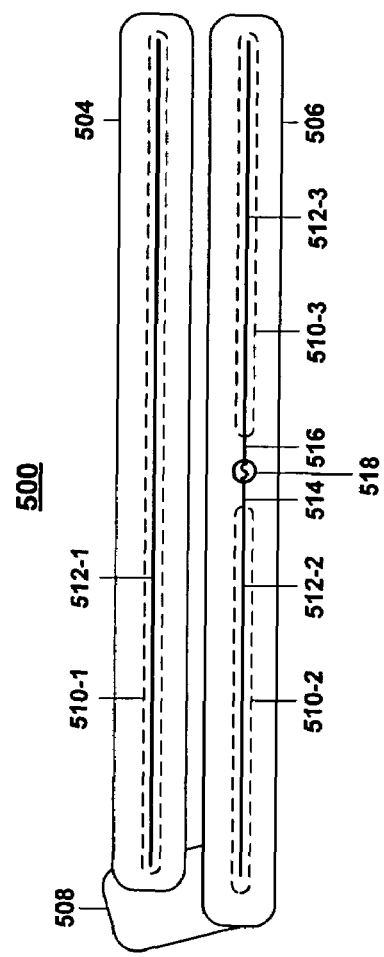
FIG. 5A
FIG. 5B

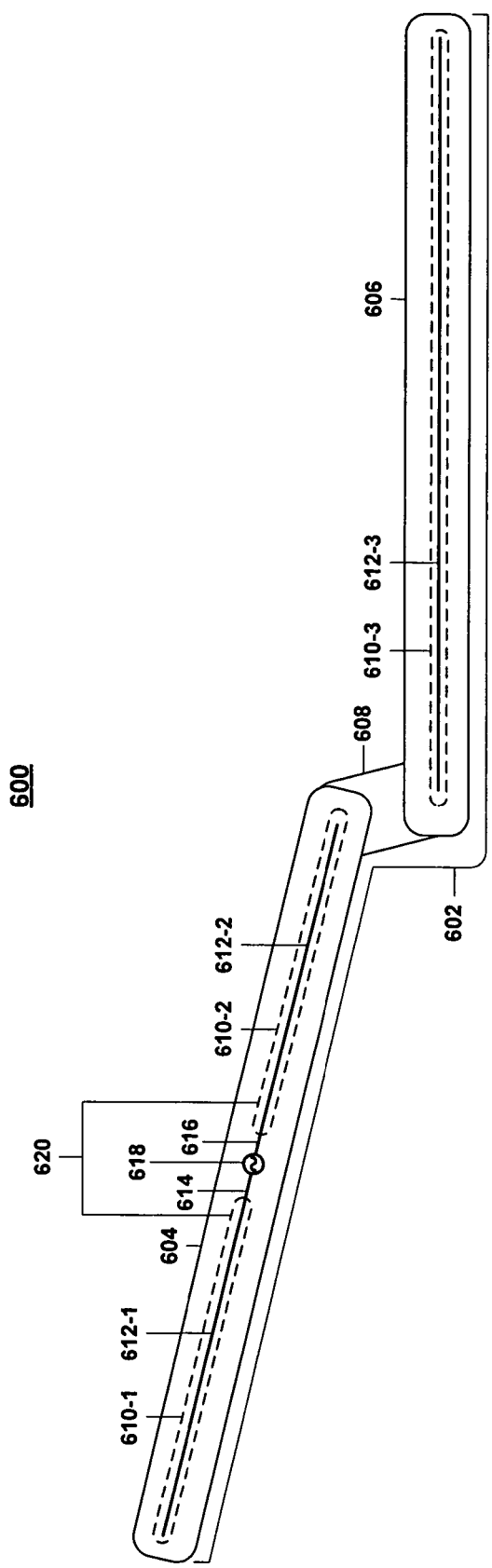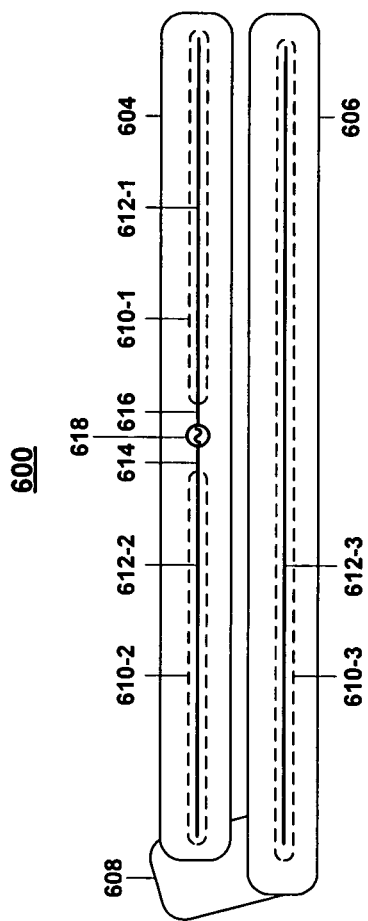

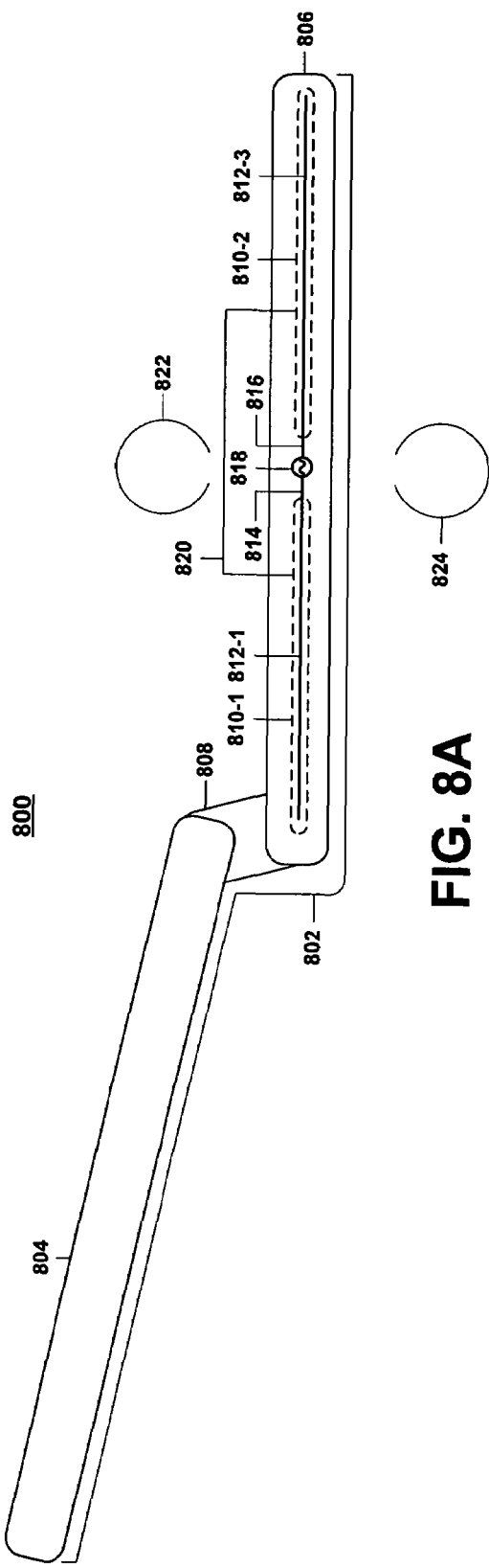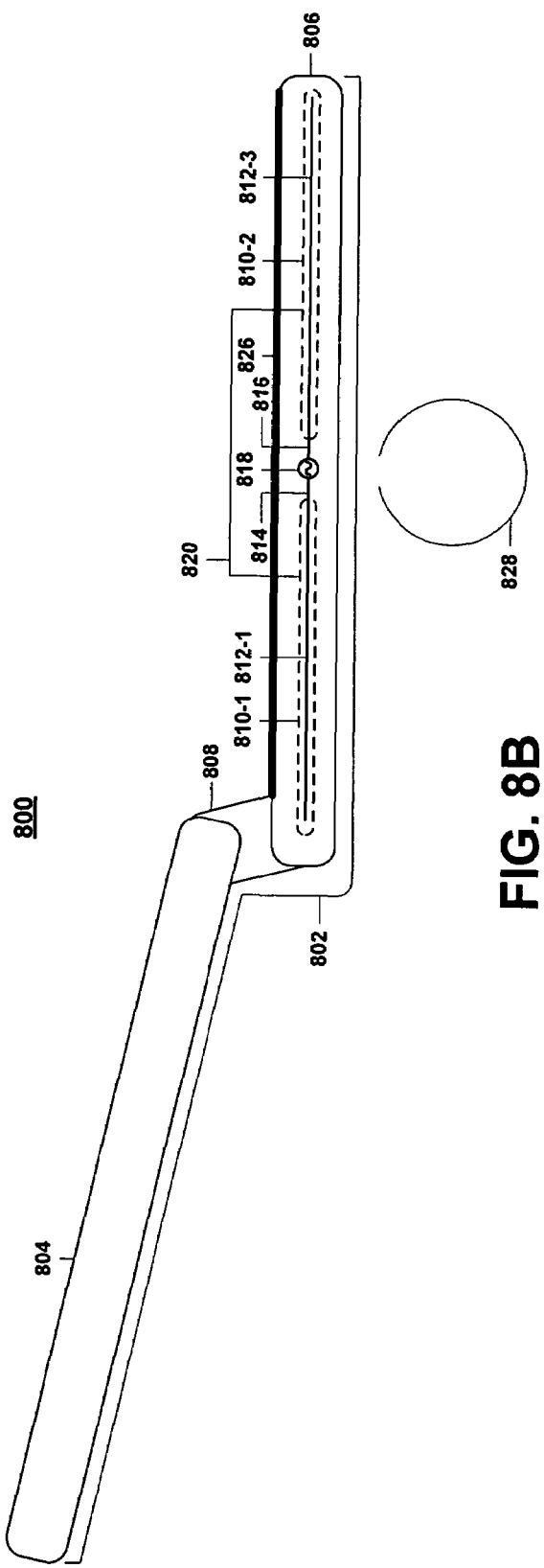

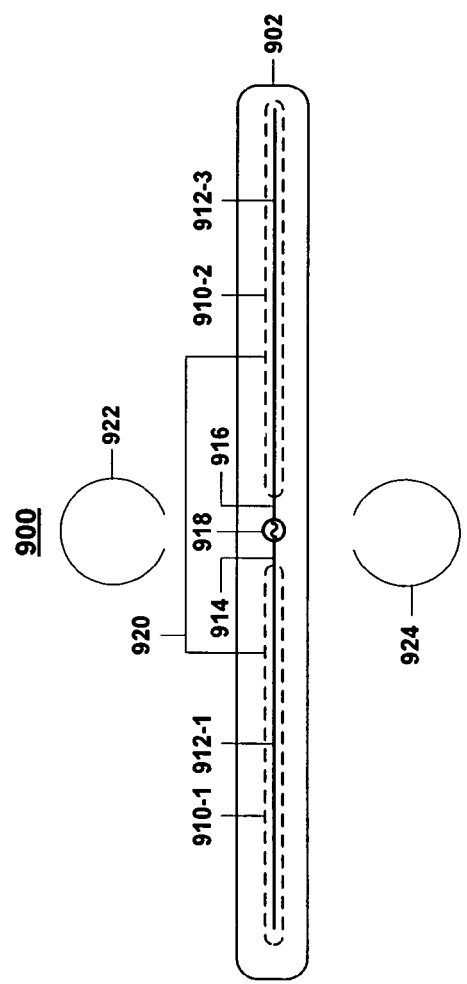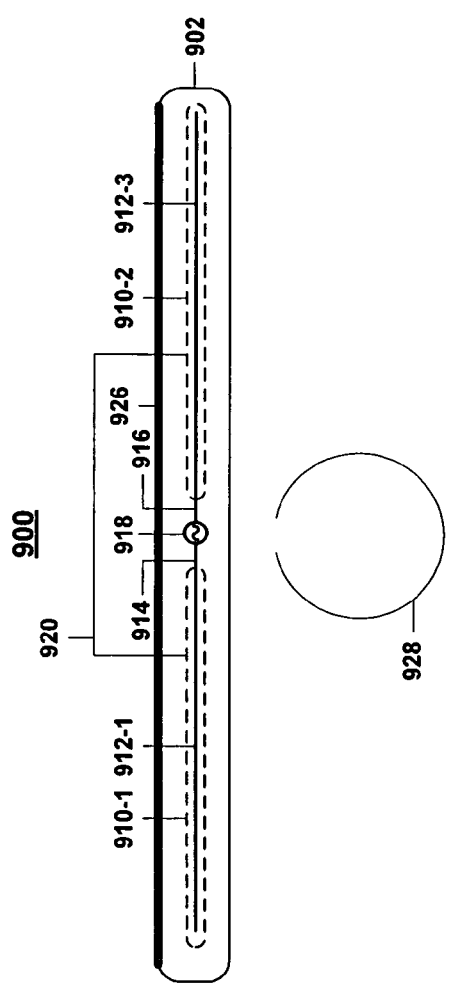

INTERNAL ANTENNA AND MOTHERBOARD ARCHITECTURE

BACKGROUND

A wireless device typically operates using a radio transmitter/receiver ("transceiver") and one or more antennas. Antenna orientation for a given wireless device is an important design consideration and is often limited by strict performance constraints. For example, some external antenna placements may expose the antenna to potential damage and may provide reduced performance or no performance at all, when in a retracted or closed position. In addition, some internal antenna placements may be undesirable since they may increase the overall size and shape of the wireless device. Such problems may be further exacerbated for those wireless devices with smaller form factors such as a mobile telephone or handheld computer. Consequently, there may be a need for improvements in antenna design.

BRIEF DESCRIPTION OF THE DRAWINGS

FIGS. 1A-C illustrate one embodiment of a wireless device having an internal antenna and motherboard architecture.

FIGS. 2A-C illustrates one embodiment of a wireless device having an internal antenna and motherboard architecture.

FIGS. 3A and 3B illustrate one embodiment of a wireless device having an internal antenna and motherboard architecture.

FIGS. 4A and 4B illustrate one embodiment of a wireless device having an internal antenna and motherboard architecture.

FIGS. 5A and 5B illustrate one embodiment of a wireless device having an internal antenna and motherboard architecture.

FIGS. 6A and 6B illustrate one embodiment of a wireless device having an internal antenna and motherboard architecture.

FIG. 8A illustrates one embodiment of a wireless device having an internal antenna and motherboard architecture.

FIG. 8B illustrates the wireless device of FIG. 8A including a cover.

FIG. 9A illustrates one embodiment of a wireless device having an internal antenna and motherboard architecture.

FIG. 9B illustrates the wireless device of FIG. 9A including a cover.

DETAILED DESCRIPTION

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Various embodiments may be directed to an internal antenna and motherboard architecture that may potentially improve the performance of a wireless device by improving one or more characteristics, such as a size, shape, form factor, power consumption, battery life, transceiver operations, signal quality, weight, and so forth. Accordingly, a user may realize enhanced products and services.

In various embodiments, the internal antenna and motherboard architecture may comprise an internal antenna system which may provide advantages in terms of industrial design, usability, and reliability for low-profile, small and compact wireless device designs. In various implementations, the internal antenna system may employ a plurality of motherboards acting as radiating elements. Because the ground plane of a motherboard may have a much larger physical dimension than a conventional internal antenna, the internal antenna and motherboard architecture may provide a wireless device with a larger internal antenna system without requiring extra physical volume. In some embodiments, the internal antenna and motherboard architecture may comprise a directional internal antenna system arranged to reduce radiation in an undesired direction and focus radiation in a desired direction. In such embodiments, the directional internal antenna system may create a lobe in the gain pattern resulting in better gain in a desired direction and may create a null in the gain pattern resulting in reduced radiation in an undesired direction. Such directionality may improve performance and may reduce specific absorption rate (SAR). In some embodiments, the internal antenna and motherboard architecture may employ a metallic cover to direct radiation and reduce SAR.

Figure 1A:
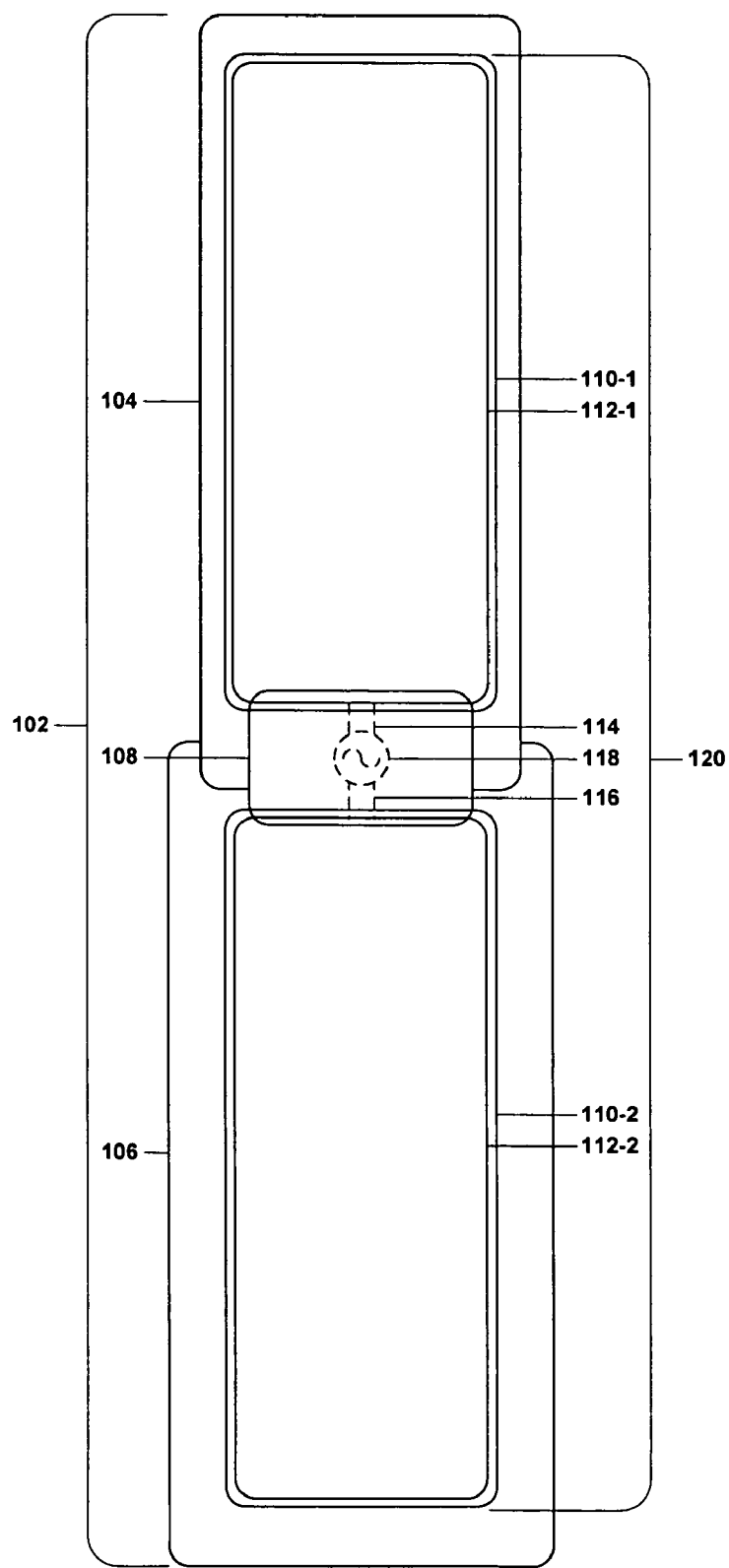

FIGS. 1A-C illustrate one embodiment of a wireless device 100 having an internal antenna and motherboard architecture. The wireless device 100 may comprise, or be implemented as, a mobile telephone, handheld computer, personal digital assistant (PDA), combination mobile telephone/PDA, data transmission device, one-way pager, two-way pager, and so forth. Although some embodiments may be described with the wireless device 100 implemented as a mobile telephone or handheld computer by way of example, it may be appreciated that other embodiments may be implemented using other wireless handheld devices as well. The embodiments are not limited in this context.

As shown, the wireless device 100 may comprise a housing 102. The housing 102 may include one or more materials such as plastic, metal, ceramic, glass, and so forth, suitable for enclosing and protecting the internal components of the wireless device 100. In various embodiments, the housing 102 may comprise an upper housing 104 and a lower housing 106 connected by a hinge 108. In such embodiments, the housing 102 may comprise a clamshell configuration in which the hinge 108 allows the upper housing 104 and lower housing 106 to pivot relative to each other. Referring to FIG. 1B, the upper housing 104 and the lower housing 106 are shown in a relatively open position. Referring to FIG. 1C, the upper housing 104 and the lower housing 106 are shown in a relatively closed or folded position. While a particular arrangement may be shown by way of example, it can be appreciated that the housing 102 may be arranged in other ways.

The wireless device 100 may comprise a plurality of motherboards, such as a first motherboard 110-1 and a second motherboard 110-2. As shown, the upper housing 104 may comprise the first motherboard 110-1, and the lower housing 106 may comprise the second motherboard 110-2. In various embodiments, the first motherboard 110-1 and/or the second motherboard 110-2 may comprise a printed circuit board (PCB). The PCB may comprise materials such as FR4, Rogers R04003, and/or Roger RT/Duroid, for example, and may include one or more conductive traces, via structures, and/or laminates. The PCB also may include a finish such as Gold, Nickel, Tin, or Lead. In various implementations, the PCB may be fabricated using processes such as etching, bonding, drilling, and plating.

Conductive traces of the PCB may be formed by chemical etching, metal etching, and other similar techniques. The traces may have any suitable pattern or geometry tuned for various operating frequencies. For example, the traces may comprise one or more center lines and/or branch lines. Phase lines and/or various chip components, such as resistors, capacitors or inductors, may be used among the center lines and/or branch lines. The different elements may be contacted or parasitic.

The wireless device 100 may comprise a plurality of ground planes, such as a first ground plane 112-1 and a second ground plane 112-2. As shown, the first motherboard 110-1 may comprise a first ground plane 112-1, and the second motherboard 110-2 may comprise a second ground plane 112-1. The first ground plane 112-1 and the second ground plane 112-2 may comprise, for example, a layer of copper or other plating metal connected to ground. In various embodiments, the first motherboard 110-1 and/or the second motherboard 110-2 may comprise a multi-layer PCB including one or more signal planes, power planes, and ground planes. The actual number of layers and/or planes, and the length of each individual layer and/or plane, may vary for a particular implementation.

In various embodiments, the ground planes 112-1, 112-2 may be coupled within the wireless device 100. As shown in FIG. 1A, for example, the first ground plane 112-1 and the second ground plane 112-2 may be coupled through a first side 114 (e.g., positive side) and a second side 116 (e.g., negative side) of a signal source 118, such as an antenna feed. In various implementations, the coupling may comprise one or more coupled transmission lines, wires, cables, circuitry, semiconductor materials, and/or other medium capable of carrying signals. It can be appreciated that the signal source 118 may be located within the hinge 108 or elsewhere within the housing 102.

In various embodiments, the first motherboard 110-1 and the second motherboard 110-2 may comprise, or form part of, an internal antenna system 120 within the wireless device 100. In various implementations, by virtue of the physics of antenna design and electromagnetic theory and the coupling of the first ground plane 112-1 to the second ground plane 112-2, the first motherboard 110-1 and the second motherboard 110-2 may act as radiating elements of the internal antenna system 120. For example, the first motherboard 110-1 may act as a first radiator arm of the internal antenna system 120, and the second motherboard 110-2 may act as a second radiating arm of the internal antenna system 120. Because the ground planes 112-1, 112-2 of the motherboards 110-1, 110-2 may have larger physical dimensions than conventional internal antennas, the wireless device 100 may comprise a relatively larger internal antenna system 120 without requiring extra physical volume.

In various implementations, the first motherboard 110-1 and the second motherboard 110-2 may be spatially separated by a predetermined amount, such as a fraction of a wavelength, for example. In certain directions, signals radiated from the first motherboard 110-1 and the second motherboard 110-2 may add constructively resulting in a lobe or stronger antenna pattern. In other directions, radiated signals may add destructively resulting in a null or weak antenna pattern. The number of lobes and/or nulls may depend on the number of radiating elements, the physical separation between radiating elements, the wavelength of the radio signal, and/or phase of the radio signal.

In various embodiments, the internal antenna system 120 may comprise a directional internal antenna system arranged to reduce radiation in an undesired direction and focus radiation in a desired direction. In such embodiments, the directional internal antenna system may create a lobe in the gain pattern resulting in better gain in a desired direction and may create a null in the gain pattern resulting in reduced radiation in an undesired direction. Such directionality may improve performance and may reduce specific absorption rate (SAR).

In various embodiments, the internal antenna system 120 may be arranged to transmit and/or receive electrical energy in accordance with a given set of performance or design constraints as desired for a particular implementation. During transmission, the internal antenna system 120 may accept energy from a transmission line and radiate this energy into space via a wireless shared media. During reception, the internal antenna system 120 may gather energy from an incident wave received over wireless shared media, and provide this energy to a corresponding transmission line. The amount of power radiated from or received by the internal antenna system 120 is typically described in terms of gain. In addition, the antenna system 120 may operate in accordance with a desired Voltage Standing Wave Ratio (VSWR) value. For example, VSWR relates to the impedance match of an antenna feed point with a feed line or transmission line of a communications device. To radiate radio frequency (FR) energy with minimum loss, or to pass along received RF energy to a wireless receiver with minimum loss, impedance may be matched to the impedance of a transmission line or feed point of a PCB.

The internal antenna system 120 may be tuned for operating at one or more frequency bands. For example, the internal antenna system 120 may allow the wireless device 100 to operate in the 824-894 Megahertz (MHz) frequency band for GSM operations, the 1850-1990 MHz frequency band for Personal Communications Services (PCS) operations, the 1575 MHz frequency band for Global Positioning System (GPS) operations, the 824-860 MHz frequency band for NAMPS operations, the 1710-2170 MHz frequency band for WCDMA/UMTS operations, and other frequency bands. This may be desirable since the wireless device 100 may be compatible with multiple wireless data, multimedia and cellular telephone systems. In addition, internal antenna system 120 may be used to implement various spatial diversity techniques to improve communication of wireless signals across one or more frequency bands of wireless shared media. In various embodiments, for example, the internal antenna system 120 may be designed for Evolution Data Optimized (EVDO) diversity at both the 800 MHz band (cellular) and the 1900 MHz (PCS). The embodiments are not limited in this context.

While the wireless device 100 shown in FIGS. 1A-C comprises an exemplary embodiment of an internal antenna and motherboard architecture, it can be appreciated that the placement or location of the first motherboard 110-1 and the second motherboard 110-2 within the wireless device 100 may be implemented in accordance with various performance and design constraints. For example, the efficiency of the internal antenna system 120 may depend upon a proper relationship between the size and shape of the motherboards 110-1, 110-2 and the wavelength of the targeted frequency. The specific frequency range that the internal antenna system 120 is designed to cover may dictate the optimal size of the motherboards 110-1, 110-2. Therefore, the specific implementation of the internal antenna system 120 may vary depending upon such factors as the target operating frequencies, power consumption requirements, battery life, a form factor of the wireless device, transceiver operations, signal quality, weight considerations of the wireless device 100, and so forth.

Figure 2A:
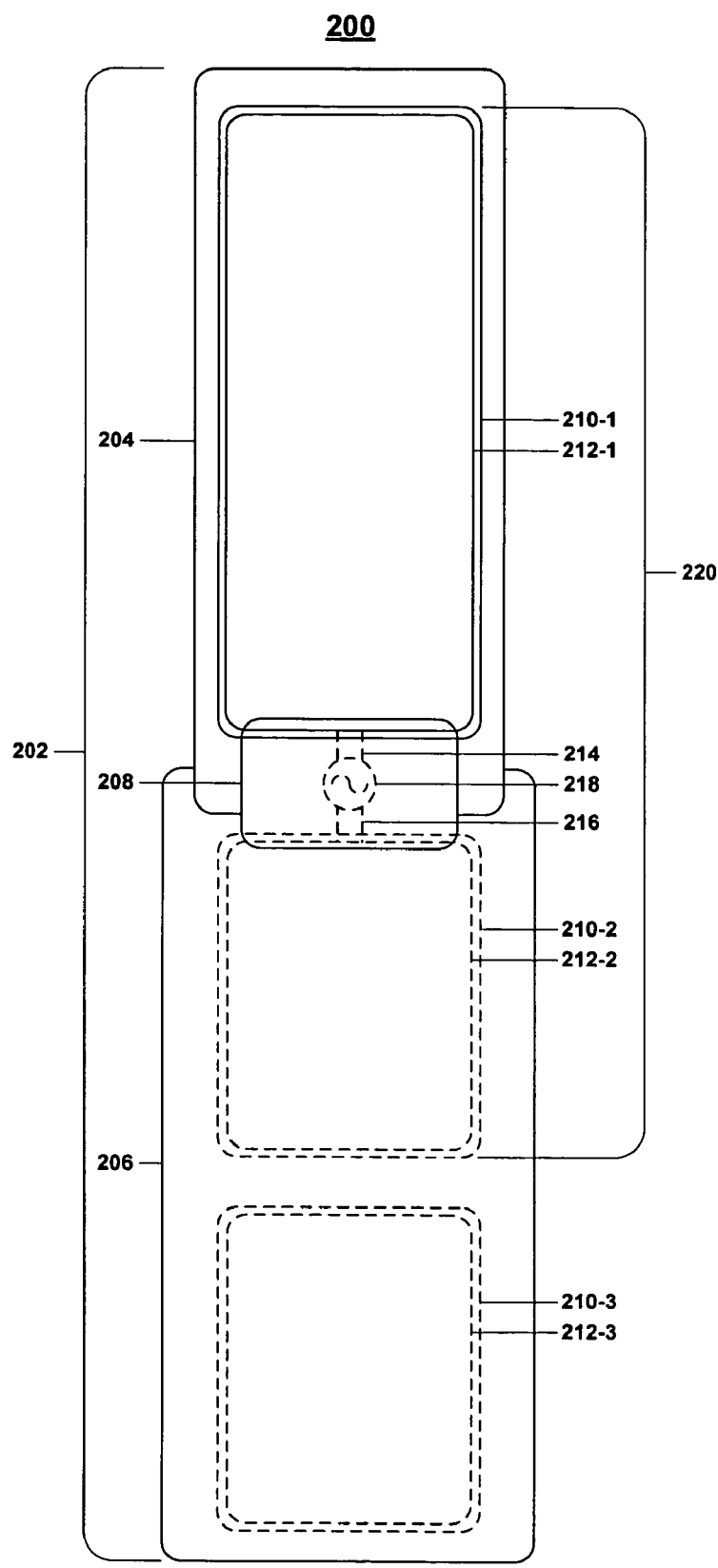

FIGS. 2A-C illustrate one embodiment of a wireless device 200 having an internal antenna and motherboard architecture. As shown, the wireless device 200 may include a housing 202 comprising an upper housing 204 and a lower housing 206 connected by a hinge 208. Referring to FIG. 2B, the upper housing 204 and the lower housing 206 are shown in a relatively open position. Referring to FIG. 2C, the upper housing 204 and the lower housing 206 are shown in a relatively closed or folded position. While a particular arrangement may be shown by way of example, it can be appreciated that the housing 202 may be arranged in other ways.

The wireless device 200 may include a first motherboard 210-1 comprising a first ground plane 212-1, a second motherboard 210-2 comprising a second ground plane 212-2, and a third motherboard 210-3 comprising a third ground plane 212-3. In various embodiments, the second motherboard 210-2 and the third motherboard 210-3 may be separated by high impedance traces and/or components. In various implementations, the first ground plane 212-1 and the second ground plane 212-2 may be coupled through a first side 214 (e.g., positive side) and a second side 216 (e.g., negative side) of a signal source 218, such as an antenna feed. As shown, the upper housing 204 may comprise the first motherboard 210-1, the lower housing 206 may comprise the second motherboard 210-2 and the third motherboard 210-3, and the signal source 218 may be located within the hinge 208.

In various embodiments, the first motherboard 210-1 and the second motherboard 210-2 may comprise, or form part of, an internal antenna system 220 within the wireless device 200. In various implementations, the first motherboard 210-1 and the second motherboard 210-2 may act as radiating elements of the internal antenna system 220. For example, the first motherboard 210-1 may act as a first radiator arm of the internal antenna system 220, and the second motherboard 210-2 may act as a second radiating arm of the internal antenna system 220.

FIG. 3A and FIG. 3B illustrate one embodiment of a wireless device 300 having an internal antenna and motherboard architecture. As shown, the wireless device 300 may include a housing 302 comprising an upper housing 304 and a lower housing 306 connected by a hinge 308. Referring to FIG. 3A, the upper housing 304 and the lower housing 306 are shown in a relatively open position. Referring to FIG. 3B, the upper housing 304 and the lower housing 306 are shown in a relatively closed or folded position. While a particular arrangement may be shown by way of example, it can be appreciated that the housing 302 may be arranged in other ways.

The wireless device 300 may include a first motherboard 310-1 comprising a first ground plane 312-1, a second motherboard 310-2 comprising a second ground plane 312-2, and a third motherboard 310-3 comprising a third ground plane 312-3. In various embodiments, the first motherboard 310-1 and the second motherboard 210-2 may be separated by high impedance traces and/or components. In various implementations, the second ground plane 312-2 and the third ground plane 312-3 may be coupled through a first side 314 (e.g., positive side) and a second side 316 (e.g., negative side) of a signal source 318, such as an antenna feed. As shown, the upper housing 304 may comprise the first motherboard 310-1 and the second motherboard 310-2, the lower housing 306 may comprise the third motherboard 310-3, and the signal source 318 may be located within the hinge 308.

In various embodiments, the second motherboard 310-2 and the third motherboard 310-3 may comprise, or form part of, an internal antenna system 320 within the wireless device 300. In various implementations, the second motherboard 310-2 and the third motherboard 310-3 may act as radiating elements of the internal antenna system 320. For example, the second motherboard 310-2 may act as a first radiator arm of the internal antenna system 320, and the third motherboard 310-3 may act as a second radiating arm of the internal antenna system 320.

FIG. 4A and FIG. 4B illustrate one embodiment of a wireless device 400 having an internal antenna and motherboard architecture. As shown, the wireless device 400 may include a housing 402 comprising an upper housing 404 and a lower housing 406 connected by a hinge 408. Referring to FIG. 4A, the upper housing 404 and the lower housing 406 are shown in a relatively open position. Referring to FIG. 4B, the upper housing 404 and the lower housing 406 are shown in a relatively closed or folded position. While a particular arrangement may be shown by way of example, it can be appreciated that the housing 402 may be arranged in other ways.

The wireless device 400 may include a first motherboard 410-1 comprising a first ground plane 412-1, a second motherboard 410-2 comprising a second ground plane 412-2, a third motherboard 410-3 comprising a third ground plane 412-3, and a fourth motherboard 410-4 comprising a fourth ground plane 412-4. In various embodiments, the first motherboard 410-1 and the second motherboard 410-2 may be separated by high impedance traces and/or components. The third motherboard 410-3 and the fourth motherboard 410-2 also may be separated by high impedance traces and/or components. In various implementations, the second ground plane 412-2 and the third ground plane 412-3 may be coupled through a first side 414 (e.g., positive side) and a second side 416 (e.g., negative side) of a signal source 418, such as an antenna feed. As shown, the upper housing 404 may comprise the first motherboard 410-1 and the second motherboard 410-2, the lower housing 406 may comprise the third motherboard 410-3 and the fourth motherboard 410-4, and the signal source 418 may be located within the hinge 408.

In various embodiments, the second motherboard 410-2 and the third motherboard 410-3 may comprise, or form part of, an internal antenna system 420 within the wireless device 400. In various implementations, the second motherboard 410-2 and the third motherboard 410-3 may act as radiating elements of the internal antenna system 420. For example, the second motherboard 410-2 may act as a first radiator arm of the internal antenna system 420, and the third motherboard 410-3 may act as a second radiating arm of the internal antenna system 420.

FIG. 5A and FIG. 5B illustrate one embodiment of a wireless device 500 having an internal antenna and motherboard architecture. As shown, the wireless device 500 may include a housing 502 comprising an upper housing 504 and a lower housing 506 connected by a hinge 508. Referring to FIG. 5A, the upper housing 504 and the lower housing 506 are shown in a relatively open position. Referring to FIG. 5B, the upper housing 504 and the lower housing 506 are shown in a relatively closed or folded position. While a particular arrangement may be shown by way of example, it can be appreciated that the housing 502 may be arranged in other ways.

The wireless device 500 may include a first motherboard 510-1 comprising a first ground plane 512-1, a second motherboard 510-2 comprising a second ground plane 512-2, and a third motherboard 510-3 comprising a third ground plane 512-3. In various implementations, the second ground plane 512-2 and the third ground plane 512-3 may be coupled through a first side 514 (e.g., positive side) and a second side 516 (e.g., negative side) of a signal source 518, such as an antenna feed. As shown, the upper housing 504 may comprise the first motherboard 510-1, and the lower housing 506 may comprise the second motherboard 510-2, the third motherboard 510-3, and the signal source 518.

In various embodiments, the second motherboard 510-2 and the third motherboard 510-3 may comprise, or form part of, an internal antenna system 520 within the wireless device 500. In various implementations, the second motherboard 510-2 and the third motherboard 510-3 may act as radiating elements of the internal antenna system 520. For example, the second motherboard 510-2 may act as a first radiator arm of the internal antenna system 520, and the third motherboard 510-3 may act as a second radiating arm of the internal antenna system 520.

FIG. 6A and FIG. 6B illustrate one embodiment of a wireless device 600 having an internal antenna and motherboard architecture. As shown, the wireless device 600 may include a housing 602 comprising an upper housing 604 and a lower housing 606 connected by a hinge 608. Referring to FIG. 6A, the upper housing 604 and the lower housing 606 are shown in a relatively open position. Referring to FIG. 6B, the upper housing 604 and the lower housing 606 are shown in a relatively closed or folded position. While a particular arrangement may be shown by way of example, it can be appreciated that the housing 602 may be arranged in other ways.

The wireless device 600 may include a first motherboard 610-1 comprising a first ground plane 612-1, a second motherboard 610-2 comprising a second ground plane 612-2, and a third motherboard 610-3 comprising a third ground plane 612-3. In various implementations, the first ground plane 612-1 and the second ground plane 612-2 may be coupled through a first side 614 (e.g., positive side) and a second side 616 (e.g., negative side) of a signal source 618, such as an antenna feed. As shown, the upper housing 604 may comprise the first motherboard 610-1, the second motherboard 610-2, and the signal source 618, and the lower housing 606 may comprise the third motherboard 610-3.

In various embodiments, the first motherboard 610-1 and the second motherboard 610-2 may comprise, or form part of, an internal antenna system 620 within the wireless device 600. In various implementations, the first motherboard 610-1 and the second motherboard 610-2 may act as radiating elements of the internal antenna system 620. For example, the first motherboard 610-1 may act as a first radiator arm of the internal antenna system 620, and the second motherboard 610-2 may act as a second radiating arm of the internal antenna system 620.

Figure 7A:
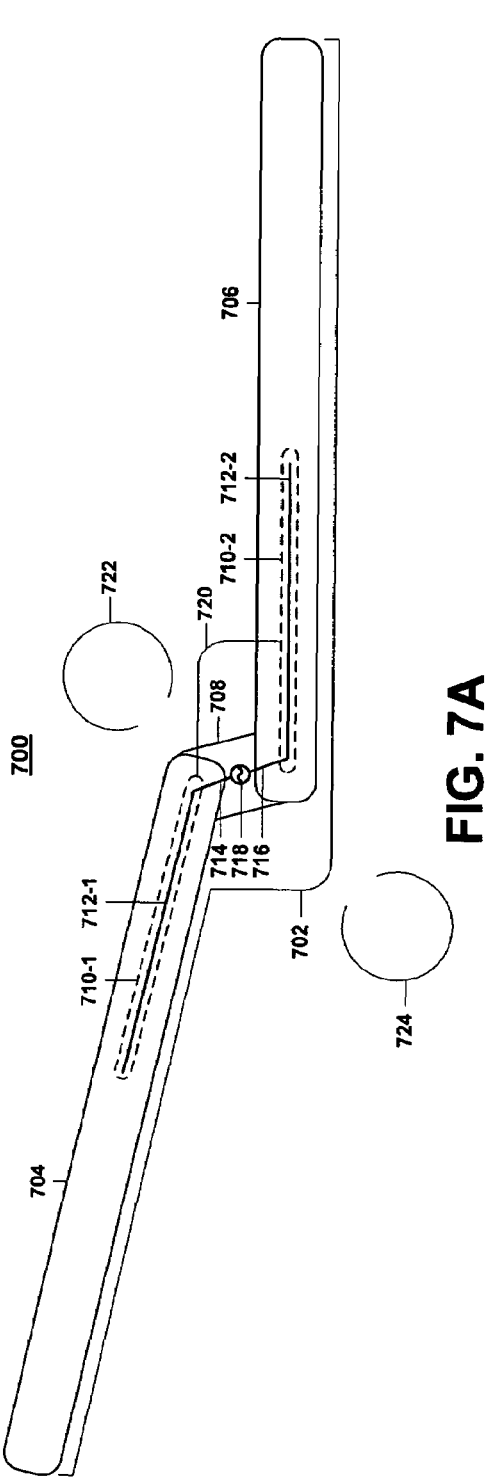
FIG. 7A illustrates one embodiment of a wireless device having an internal antenna and motherboard architecture.

FIG. 7A illustrates one embodiment of a wireless device 700 having an internal antenna and motherboard architecture. As shown, the wireless device 700 may include a housing 702 comprising an upper housing 704 and a lower housing 706 connected by a hinge 708. The upper housing 704 and the lower housing 706 are shown in a relatively open position. While a particular arrangement may be shown by way of example, it can be appreciated that the housing 702 may be arranged in other ways.

The wireless device 700 may include a first motherboard 710-1 comprising a first ground plane 712-1, and a second motherboard 710-2 comprising a second ground plane 712-2. In various implementations, the first ground plane 712-1 and the second ground plane 712-2 may be coupled through a first side 714 (e.g., positive side) and a second side 716 (e.g., negative side) of a signal source 718, such as an antenna feed. As shown, the upper housing 704 may comprise the first motherboard 710-1, the lower housing 706 may comprise the second motherboard 710-2, and the signal source 718 may be located within the hinge 708.

In various embodiments, the first motherboard 710-1 and the second motherboard 710-2 may comprise, or form part of, an internal antenna system 720 within the wireless device 700. In various implementations, the first motherboard 710-1 and the second motherboard 710-2 may act as radiating elements of the internal antenna system 720. For example, the first motherboard 710-1 may act as a first radiator arm of the internal antenna system 720, and the second motherboard 710-2 may act as a second radiating arm of the internal antenna system 720.

As shown in FIG. 7A, the wireless device 700 may radiate a first antenna pattern 722 and a second antenna pattern 724. In various embodiments, the internal antenna system 720 may comprise a directional internal antenna system arranged to reduce radiation in an undesired direction and focus radiation in a desired direction. In such embodiments, the directional internal antenna system may create a lobe in the gain pattern resulting in better gain in a desired direction. Such directionality may improve performance and may reduce SAR.

Figure 7B:
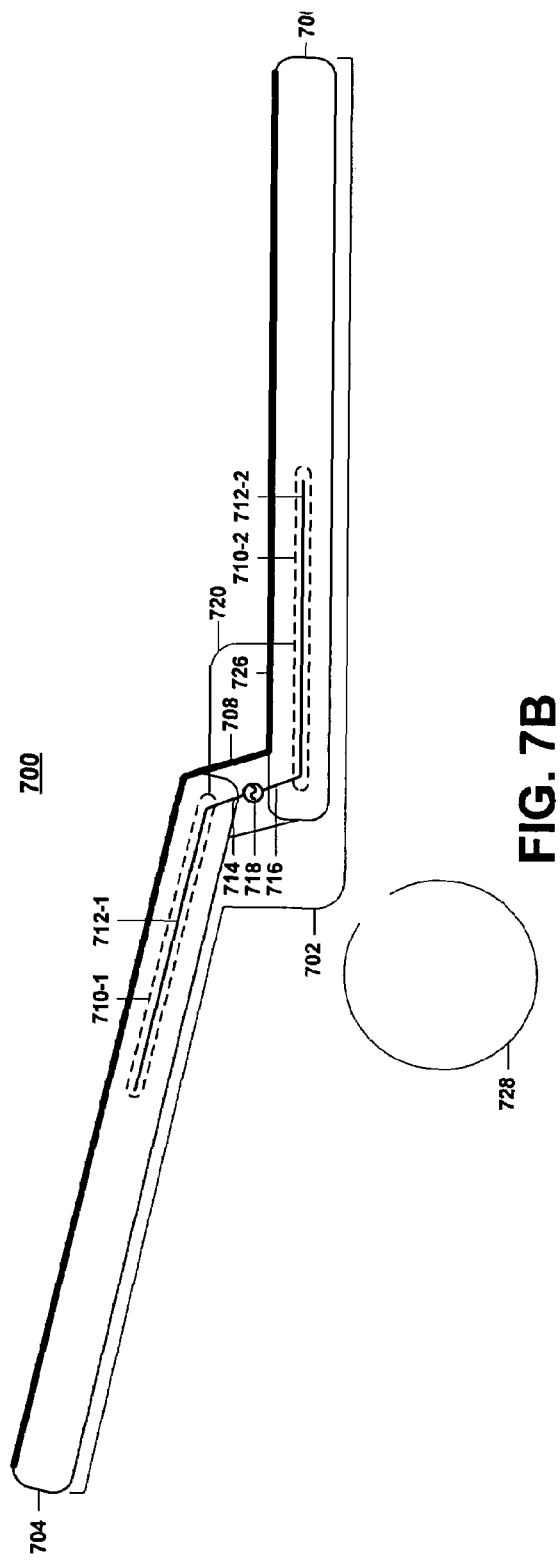
FIG. 7B illustrates the wireless device of FIG. 7A including a cover.

FIG. 7B illustrates the wireless device 700 including a cover 726. In various implementations, the cover 726 may comprise a metallic material. In various embodiments, the cover 726 may be arranged to reduce radiation energy in an undesired direction and to focus radiation in a desired direction. In such embodiments, the directional internal antenna system may create a null in the gain pattern resulting in reduced radiation in an undesired direction. Such directionality may improve performance and may reduce SAR. For example, an internal antenna system 720 employing the cover 726 may comprise a directional internal antenna system arranged to radiate a greater and/or more efficient antenna pattern 728. In various embodiments, the use of the cover 726 also may reduce the radiation absorbed by body tissue (e.g., SAR).

FIG. 8A illustrates one embodiment of a wireless device 800 having an internal antenna and motherboard architecture. As shown, the wireless device 800 may include a housing 802 comprising an upper housing 804 and a lower housing 806 connected by a hinge 808. The upper housing 804 and the lower housing 806 are shown in a relatively open position. While a particular arrangement may be shown by way of example, it can be appreciated that the housing 802 may be arranged in other ways.

The wireless device 800 may include a first motherboard 810-1 comprising a first ground plane 812-1, and a second motherboard 810-2 comprising a second ground plane 812-2. In various implementations, the first ground plane 812-1 and the second ground plane 812-2 may be coupled through a first side 814 (e.g., positive side) and a second side 816 (e.g., negative side) of a signal source 818, such as an antenna feed. As shown, the lower housing 806 may comprise the first motherboard 810-1, the second motherboard 810-2, and the signal source 818.

In various embodiments, the first motherboard 810-1 and the second motherboard 810-2 may comprise, or form part of, an internal antenna system 820 within the wireless device 800. In various implementations, the first motherboard 810-1 and the second motherboard 810-2 may act as radiating elements of the internal antenna system 820. For example, the first motherboard 810-1 may act as a first radiator arm of the internal antenna system 820, and the second motherboard 810-2 may act as a second radiating arm of the internal antenna system 820.

As shown in FIG. 8A, the wireless device 800 may radiate a first antenna pattern 822 and a second antenna pattern 824. In various embodiments, the internal antenna system 820 may comprise a directional internal antenna system arranged to reduce radiation in an undesired direction and focus radiation in a desired direction. In such embodiments, the directional internal antenna system may create a lobe in the gain pattern resulting in better gain in a desired direction. Such directionality may improve performance and may reduce SAR.

FIG. 8B illustrates the wireless device 800 including a cover 826. In various implementations, the cover 826 may comprise a metallic material. In various embodiments, the cover 826 may be arranged to reduce radiation energy in an undesired direction and to focus radiation in a desired direction. In such embodiments, the directional internal antenna system may create a null in the gain pattern resulting in reduced radiation in an undesired direction. Such directionality may improve performance and may reduce SAR. For example, an internal antenna system 820 employing the cover 826 may comprise a directional internal antenna system arranged to radiate a greater and/or more efficient antenna pattern 828. In various embodiments, the use of the cover 826 also may reduce the radiation absorbed by body tissue (e.g., SAR).

FIG. 9A illustrates one embodiment of a wireless device 900 having an internal antenna and motherboard architecture. As shown, the wireless device 900 may include a housing 902. In this embodiment, the housing 902 may comprise a candy bar configuration. While a particular arrangement may be shown by way of example, it can be appreciated that the housing 902 may be arranged in other ways.

The wireless device 900 may include a first motherboard 910-1 comprising a first ground plane 912-1, and a second motherboard 910-2 comprising a second ground plane 912-2. In various implementations, the first ground plane 912-1 and the second ground plane 912-2 may be coupled through a first side 914 (e.g., positive side) and a second side 916 (e.g., negative side) of a signal source 918, such as an antenna feed.

In various embodiments, the first motherboard 910-1 and the second motherboard 910-2 may comprise, or form part of, an internal antenna system 920 within the wireless device 900. In various implementations, the first motherboard 910-1 and the second motherboard 910-2 may act as radiating elements of the internal antenna system 920. For example, the first motherboard 910-1 may act as a first radiator arm of the internal antenna system 920, and the second motherboard 910-2 may act as a second radiating arm of the internal antenna system 920.

As shown in FIG. 9A, the wireless device 900 may radiate a first antenna pattern 922 and a second antenna pattern 924. In various embodiments, the internal antenna system 920 may comprise a directional internal antenna system arranged to reduce radiation in an undesired direction and focus radiation in a desired direction. In such embodiments, the directional internal antenna system may create a lobe in the gain pattern resulting in better gain in a desired direction. Such directionality may improve performance and may reduce SAR.

FIG. 9B illustrates the wireless device 900 including a cover 926. In various implementations, the cover 926 may comprise a metallic material. In various embodiments, the cover 926 may be arranged to reduce radiation energy in an undesired direction and to focus radiation in a desired direction. In such embodiments, the directional internal antenna system may create a null in the gain pattern resulting in reduced radiation in an undesired direction. Such directionality may improve performance and may reduce SAR. For example, an internal antenna system 920 employing the cover 926 may comprise a directional internal antenna system arranged to radiate a greater and/or more efficient antenna pattern 928. In various embodiments, the use of the cover 926 also may reduce the radiation absorbed by body tissue (e.g., SAR).

Figure 10:
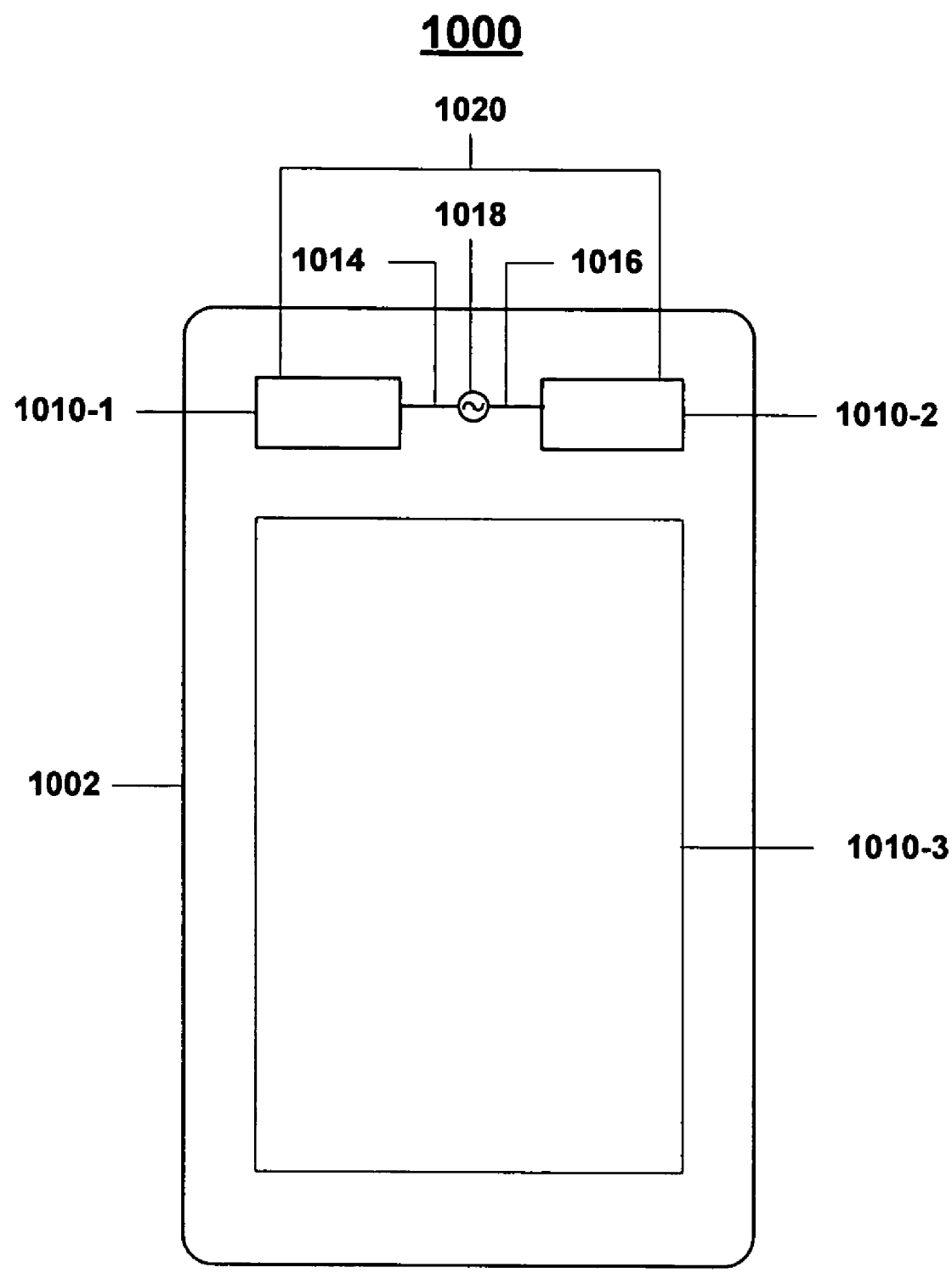
FIG. 10 illustrates one embodiment of a wireless device having an internal antenna and motherboard architecture.

FIG. 10 illustrates one embodiment of a wireless device 1000 having an internal antenna and motherboard architecture. As shown, the wireless device 1000 may include a housing 1002. In this embodiment, the housing 1002 may comprise a candy bar configuration. While a particular arrangement may be shown by way of example, it can be appreciated that the housing 902 may be arranged in other ways.

The wireless device 1000 may include a first motherboard 1010-1, a second motherboard 1010-2, and a third motherboard 1010-3. In various implementations, a ground plane of the first motherboard 1010-1 and a ground plane of the second motherboard 1010-2 may be coupled through a first side 1014 (e.g., positive side) and a second side 1016 (e.g., negative side) of a signal source 1018, such as an antenna feed.

The first motherboard 1010-1 and the second motherboard 1010-2 may comprise, or form part of, an internal antenna system 1020 within the wireless device 1000. In various embodiments, the first motherboard 1010-1 and the second motherboard 1010-2 may act as radiating elements of the internal antenna system 1020. For example, the first motherboard 1010-1 may act as a first radiator arm of the internal antenna system 1020, and the second motherboard 1010-2 may act as a second radiating arm of the internal antenna system 1020.

Figure 11A:
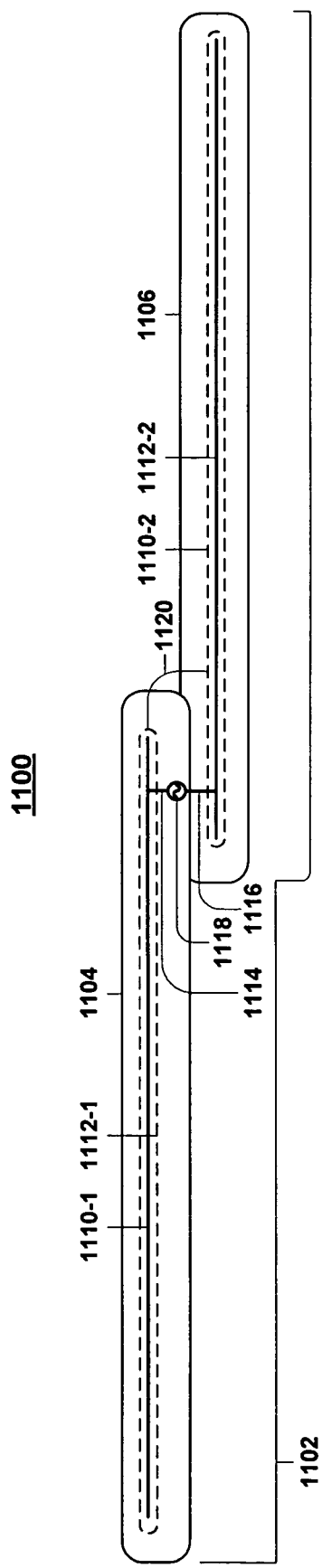
FIGS. 11A and 11B illustrate one embodiment of a wireless device having an internal antenna and motherboard architecture.
Figure 11B:
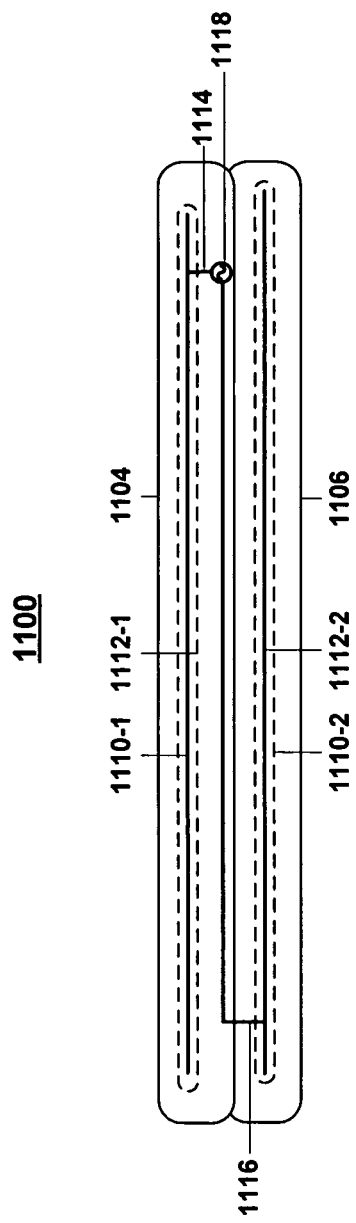

FIG. 11A and FIG. 11B illustrates one embodiment of a wireless device 1100 having an internal antenna and motherboard architecture. As shown, the wireless device 1100 may include a housing 1102 comprising an upper housing 1104 in sliding engagement with a lower housing 1106. In such embodiments, the housing 102 may comprise a slider configuration in which the upper housing 104 and lower housing 106 may slide relative to each other. Referring to FIG. 11A, the upper housing 1104 and the lower housing 1106 are shown in a relatively open position. Referring to FIG. 11B, the upper housing 1104 and the lower housing 1106 are shown in a relatively closed position. While a particular arrangement may be shown by way of example, it can be appreciated that the housing 1102 may be arranged in other ways.

The wireless device 1100 may include a first motherboard 1110-1 and a second motherboard 1110-2. In various implementations, a ground plane of the first motherboard 1110-1 and a ground plane of the second motherboard 1110-2 may be coupled through a first side 1114 (e.g., positive side) and a second side 1116 (e.g., negative side) of a signal source 1118, such as an antenna feed.

The first motherboard 1110-1 and the second motherboard 1110-2 may comprise, or form part of, an internal antenna system 1120 within the wireless device 1100. In various embodiments, the first motherboard 1110-1 and the second motherboard 1110-2 may act as radiating elements of the internal antenna system 1120. For example, the first motherboard 1110-1 may act as a first radiator arm of the internal antenna system 1120, and the second motherboard 1110-2 may act as a second radiating arm of the internal antenna system 1120.

It can be appreciated that any of the embodiments described above may comprise a direction internal antenna system by employing a cover. Furthermore, although not shown, it can be appreciated that a wireless device may comprise elements such as a display, an input/output (I/O) device, a processor, a memory, and a transceiver, for example. One or more elements may be implemented using one or more circuits, components, registers, processors, software subroutines, modules, or any combination thereof, as desired for a given set of design or performance constraints.

The display may be implemented using any type of visual interface such as a liquid crystal display (LCD), a touch-sensitive display screen, and so forth. The I/O device may be implemented, for example, using an alphanumeric keyboard, a numeric keypad, a touch pad, input keys, buttons, switches, rocker switches, a stylus, and so forth. The embodiments are not limited in this context.

The processor may be implemented using any processor or logic device, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processor may be implemented as a general purpose processor, such as a processor made by Intel® Corporation, Santa Clara, Calif. The processor also may be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), and so forth. The embodiments are not limited in this context.

The memory may be implemented using any machine-readable or computer-readable media capable of storing data, including both volatile and non-volatile memory. For example, memory may include read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information. It is worthy to note that some portion or all of memory may be included on the same integrated circuit as a processor, or alternatively some portion or all of memory may be disposed on an integrated circuit or other medium, for example a hard disk drive, that is external to the integrated circuit of a processor. The embodiments are not limited in this context.

The transceiver may be implemented, for example, by any transceiver suitable for operating at a given set of operating frequencies and wireless protocols for a particular wireless system. For example, the transceiver may be a two-way radio transceiver arranged to operate in the 824-894 MHz frequency band (GSM), the 1850-1990 MHz frequency band (PCS), the 1575 MHz frequency band (GPS), the 824-860 MHz frequency band (NAMPS), the 1710-2170 MHz frequency band (WCDMA/UMTS), ISM band in 2.4 GHz range for WiFi and Bluetooth, or other frequency bands. In various embodiments, an internal antenna system may be electrically connected to a transceiver operatively associated with a signal processing circuit or processor positioned on a PCB. In order to increase power transfer, the transceiver may be interconnected to an internal antenna system such that respective impedances are substantially matched or electrically tuned to compensate for undesired antenna impedance. In some cases, the transceiver may be implemented as part of a chip set associated with a processor. The embodiments are not limited in this context.

When implemented within a wireless system, for example, a wireless device may be arranged to communicate information over one or more types of wireless communication media, sometimes referred to herein as wireless shared media. An example of a wireless communication media may include portions of a wireless spectrum, such as the RF spectrum. The wireless device may include components and interfaces suitable for communicating information signals over the designated wireless spectrum, such as one or more antennas, wireless transceivers, amplifiers, filters, control logic, and so forth. The embodiments are not limited in this context.

In various embodiments, a wireless device may communicate over wireless shared media in accordance with a number of wireless protocols. Examples of wireless protocols may include various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may include various WWAN protocols, such as GSM cellular radiotelephone system protocols with GPRS, CDMA cellular radio-telephone communication systems with 1xRTT, EDGE systems, EV-DO systems, EV-DV systems, HSDPA systems, and so forth. Further examples of wireless protocols may include wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may include near-field communication techniques and protocols, such as electromagnetic induction (EMI) techniques. An example of EMI techniques may include passive or active radio-frequency identification (RFID) protocols and devices. Other suitable protocols may include Ultra Wide Band (UWB), Digital Office (DO), Digital Home, Trusted Platform Module (TPM), ZigBee, and other protocols. The embodiments are not limited in this context.

In various embodiments, a wireless device may comprise part of a cellular communication system. Examples of cellular communication systems may include Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) cellular radiotelephone systems, Extended-TDMA (E-TDMA) cellular radiotelephone systems, Narrowband Advanced Mobile Phone Service (NAMPS) cellular radiotelephone systems, third generation (3G) systems such as Wide-band CDMA (WCDMA), CDMA-2000, Universal Mobile Telephone System (UMTS) cellular radiotelephone systems compliant with the Third-Generation Partnership Project (3GPP), and so forth. The embodiments are not limited in this context.

In addition to voice communication services, a wireless device may be arranged to communicate using a number of different wireless wide area network (WWAN) data communication services. Examples of cellular data communication systems offering WWAN data communication services may include a GSM with General Packet Radio Service (GPRS) systems (GSM/GPRS), CDMA/1xRTT systems, Enhanced Data Rates for Global Evolution (EDGE) systems, Evolution Data Only or EVDO systems, Evolution for Data and Voice (EV-DV) systems, High Speed Downlink Packet Access (HSDPA) systems, and so forth. The embodiments are not limited in this respect.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. A wireless device, comprising:
a housing enclosing a first motherboard comprising a first ground plane and a second motherboard comprising a second ground plane, said first ground plane coupled to said second ground plane within said housing; and
an internal antenna system for said wireless device, said internal antenna system comprising said first motherboard and said second motherboard, said first motherboard to act as a first radiating arm of said internal antenna system, and said second motherboard to act as a second radiating arm of said internal antenna system.

2. The wireless device of claim 1, said first ground plane coupled to said second ground plane through a signal source.

3. The wireless device of claim 1, further comprising a third motherboard.

4. The wireless device of claim 3, said third motherboard separated from at least one of said first motherboard and said second motherboard by high impedance traces or components.

5. The wireless device of claim 1, said housing comprising an upper housing and a lower housing connected by a hinge.

6. The wireless device of claim 5, said upper housing comprising said first motherboard, said lower housing comprising said second motherboard.

7. The wireless device of claim 5, said upper housing comprising said first motherboard and said second motherboard.

8. The wireless device of claim 5, said lower housing comprising said first motherboard and said second motherboard.

9. The wireless device of claim 1, wherein said internal antenna system is arranged to reduce radiation in an undesired direction and focus radiation in a desired direction.

10. The wireless device of claim 1, further comprising a cover to direct radiation from said internal antenna system.

11. The wireless device of claim 10, wherein said cover reduces specific absorption rate.

12. An internal antenna system for a wireless device, comprising:
a first motherboard comprising a first ground plane; and
a second motherboard comprising a second ground plane, said first ground plane coupled to said second ground plane, said first motherboard to act as a first radiating arm of said internal antenna system, and said second motherboard to act as a second radiating arm of said internal antenna system.

13. The internal antenna system of claim 12, said first ground plane coupled to said second ground plane through a signal source.

14. The internal antenna system of claim 12, wherein said first motherboard and said second motherboard reduce radiation in an undesired direction and focus radiation in a desired direction.

15. The internal antenna system of claim 12, further comprising a cover to direct radiation from said internal antenna system.

16. The internal antenna system of claim 15, wherein said cover reduces specific absorption rate.

17. A directional internal antenna system for a wireless device, comprising:
a first motherboard;
a second motherboard coupled to said first motherboard, said first motherboard to act as a first radiating arm, said second motherboard to act as a second radiating arm; and
a cover for said wireless device, said cover to direct radiation from said first radiating arm and said second radiating arm.

18. The directional internal antenna system of claim 17, said first motherboard and said second motherboard to reduce radiation in an undesired direction and focus radiation in a desired direction.

19. The directional internal antenna system of claim 17, said cover to reduce specific absorption rate.

20. The directional internal antenna system of claim 17, said first motherboard coupled to said second motherboard through a signal source.

* * * * *